US006344270B1

(12) United States Patent
McCullough et al.

(10) Patent No.: US 6,344,270 B1
(45) Date of Patent: Feb. 5, 2002

(54) METAL MATRIX COMPOSITE WIRES, CABLES, AND METHOD

(75) Inventors: Colin McCullough, Minneapolis, MN (US); David C. Lueneburg, Austin, TX (US); Paul S. Werner, Woodbury, MN (US); Herve E. Deve, Minneapolis, MN (US); Michael W. Carpenter; Kenneth L. Yarina, both of St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/616,594

(22) Filed: Jul. 14, 2000

(51) Int. Cl.[7] ......................... B32B 15/00; B22D 19/00; H01B 11/02

(52) U.S. Cl. ....................... 428/389; 428/368; 428/375; 428/378; 428/379; 428/558; 428/570; 428/614; 428/567; 174/113 R; 174/119 R; 164/91; 164/97; 164/100; 164/105; 164/501

(58) Field of Search ................................ 428/375, 389, 428/368, 379, 558, 570, 614, 567, 378; 174/113 R, 119 R; 164/47, 91, 97, 100, 105, 501

(56) References Cited

U.S. PATENT DOCUMENTS

| | | | |
|---|---|---|---|
| 4,649,060 A | 3/1987 | Ishikawa et al. | 427/57 |
| 4,779,563 A | 10/1988 | Ishikawa et al. | 118/612 |
| 4,877,643 A | 10/1989 | Ishikawa et al. | 427/57 |

(List continued on next page.)

FOREIGN PATENT DOCUMENTS

| | | |
|---|---|---|
| EP | 0162 542 B1 | 7/1992 |
| JP | 54-89907 | 7/1979 |
| JP | 6-158197 | 6/1994 |
| WO | WO 92/14860 | 9/1992 |
| WO | WO 97/00976 | 1/1997 |

OTHER PUBLICATIONS

Y. Yasutomi, et al., "Effects of the SiC/Al interface reaction on fracture beharior of a composite conductor using SiC fiber reinforced aluminum for next generation power equipment", *Journal of Materials Science*34 (1999) pp. 1583–1593.

Chenge Zhang and Lingsen Wang, "SiC Fiber/Aluminum Preform Wires Fabricated By Ultrasonic Liquid Infiltration Process", Central South Univ. of Technology, Changsha (China) 1995, pp. 1–5.

Akio Ozawa et al., "Mechanical Characteristics of SiC Fiber Reinforced Aluminum Composite Material", 1995 The Electricity Society National Symposium.

Akio Ozawa et al., "Mechanical Characteristics of SiC fiber reinforced Composite Wire", 1996 The Electricity Society National Symposium.

Akio Ozawa et al., "Development and Evaluation Characterstics of SiC Fiber Reinforced Aluminum Composite Wires for Transmission Line", 1995 The Electricity Society Electronics and Energy Department Symposium.

H. Gigerenzer et al., "Hot–Drawing of Fiber (Filament) Reinforced Metal–Matrix Composites", Proceedings of the 1978 International Conference on Composite Materials, ICCM/2, Apr. 16–20, 1978.

David M. Goddard et al., "Continuous Graphite Fiber MMCs", *Engineered Materials Handbook*, vol. 1, Composites, 1987.

(List continued on next page.)

*Primary Examiner*—Cynthia H. Kelly
*Assistant Examiner*—J. M. Gray

(57) ABSTRACT

Metal matrix composite wires that include at least one tow comprising a plurality of substantially continuous, longitudinally positioned fibers in a metal matrix. The fibers are selected from the group of ceramic fibers carbon fibers, and mixtures thereof. The wires have certain specified characteristics such as roundness values, roundness uniformity values, and/or diameter uniformity values.

40 Claims, 3 Drawing Sheets

U.S. PATENT DOCUMENTS

| | | | | | |
|---|---|---|---|---|---|
| 4,961,990 | A | | 10/1990 | Yamada et al. | 428/240 |
| 5,171,942 | A | | 12/1992 | Powers | 174/129 R |
| 5,244,478 | A | * | 9/1993 | Weeks, Jr. et al. | 428/614 |
| 5,501,906 | A | * | 3/1996 | Deve | 428/368 |
| 5,554,826 | A | | 9/1996 | Gentry | 174/128.1 |
| 5,736,199 | A | | 4/1998 | Blucher | 427/430 |
| 6,180,232 | B1 | * | 1/2001 | McCullough et al. | 428/379 |
| 6,245,425 | B1 | * | 6/2001 | McCullough et al. | 428/379 |

OTHER PUBLICATIONS

Howard A. Katzman, "Fiber Coatings for Composite Fabrication", *Materials & Manufacturing Processes*, 5(1), 1–15 (1990).

H.M. Cheng et al., "Preparation of Carbon Fibre Reinforced Aluminium Via Ultrasonic Liquid Infiltration Technique", *Materials Science and Technology*, Jul. 1993, vol. 9, pp. 609–614.

H. Gigerenzer et al., "Drawing of Graphite Fiber Reinforced Aluminum Composites", Failure Modes in Composites IV, Proceedings of a symposium sponsored by the TMS–AIME/ASM Joint Composite Materials Committee, Oct. 24–26, 1977, pp. 359–369.

Joseph T. Blucher et al., "A New Pressure Infiltration Process for Continuous Production of Fiber Reinforced MMC Structural Elements", 30$^{th}$ International Sample Technical Conference, Oct. 20–24, 1998.

Y. Tsunekawa et al., "Application of Ultrasonic Vibration to Molten Aluminum Infiltration", *Key Engineering Materials* vols. 104–107 (1995) pp. 215–224.

J.H. Nader et al., "Correlation of Thermal Models with Microstructural Effects in Continuous MMC Wire Production", *Materials Science and Engineering* A266 (1999) 52–61.

M.G. Williams et al., "Analytically Motivated Process Improvements in Continuous Metal–Matrix Composite Wire Fabrication", *Materials Science and Engineering* A266 (1999) 86–92.

Hong Wan, Jin Pan, Deming Yang, "In–Situ Aluminum Matrix Composite Prepared by Ultrasonic VIbration", Proceedings of ICCM–10, Whistler, B.c. Canada, Aug. 1995, pp. 161–167.

L. Pennander and C–H Andersson, "Vibration Exitated Low Pressure Casting, A New Route to Produce Preform Based Metal Matrix Composite Materials", Proceedings of the 12$^{th}$ RiøInternational Symposium on Materials Science, Sep. 2–6, 1991.

J. Pan, C. Li, D.M. Yang and X.F. Yin, "A Study About the Mechanism of Ultrasonic Liquid Infiltration for $SiC_f$/Al Composites", Proceedings of the Ninth International Conference on Composite Materials (ICCM/9), Madrid, Jul. 12–16, 1993.

L–O Pennander et al., "Vibration Excitated Low–Pressure Casting, A New Route to Produce Metal Matrix Composites", Mar. 1, 1991, ICCM/VIII, Section 12–21.

T. Yamauchi and Y. Nishida, "Infiltration Kinetics of Fibrous Preforms by Aluminium with Soldification", (Title unreadable) vol. 43(?), pp. 1313–1321, 1995 [Best copy available].

Robert G. Shaver, "Metal Matrix Compositing by Continuous Casting", Proceedings of the Sixth St. Louis Symposium, May 11–12, 1972.

H. Nakanishi et al., "Ultrasound–assisted pressureless filtration of molten aluminium into alumina capillaries", *Journal of Materials Science Letters* 12 (1993) pp. 1313–1315.

J. Pan, D.M. Yang and X.F. Yin, "A study of the ultrasonic technique applied in fabrication of SiC fiber–reinforced aluminum composites", *J. Mater. Res.*, vol. 10, No. 3, Mar. 1995, pp. 596–601.

Yang Deming, Yin Xinfang, Pan Jin, "Continous yarn fibre–reinforced aluminum composites prepared by the ultrasonic liquid infiltration method", *Journal of Materials Science Letters* 12 (1993) pp. 252–253.

A.J. Cook and P.S. Werner, "Pressure Infiltration Casting of Metal Matrix Composites", *Materials Science and Engineering*, A144 (1991) pp. 189–206.

* cited by examiner

METAL MATRIX COMPOSITE WIRES, CABLES, AND METHOD

FIELD OF THE INVENTION

The present invention pertains to composite wires reinforced with substantially continuous fibers within a metal matrix and cables incorporating such wires.

BACKGROUND OF THE INVENTION

Metal matrix composite's (MMC's) have long been recognized as promising materials due to their combination of high strength and stiffness combined with low weight. MMC's typically include a metal matrix reinforced with fibers. Examples of metal matrix composites include aluminum matrix composite wires (e.g., silicon carbide, carbon, boron, or polycrystalline alpha alumina fibers in an aluminum matrix), titanium matrix composite tapes (e.g., silicon carbide fibers in a titanium matrix), and copper matrix composite tapes (e.g., silicon carbide fibers in a copper matrix).

The use of some metal matrix composite wires as a reinforcing member in bare overhead electrical power transmission cables is of particular interest. The need for new materials in such cables is driven by the need to increase the power transfer capacity of existing transmission infrastructure due to load growth and changes in power flow due to deregulation.

The availability of wires having a round cross-section is desirable in providing cable constructions that are more uniformly packed. The availability of round wires having a more uniform diameter along their length is desirable in providing cable constructions having a more uniform diameter. Thus, there is a need for a substantially continuous metal matrix composite wire having a round cross-section and uniform diameter.

SUMMARY OF THE INVENTION

The present invention relates to substantially continuous fiber metal matrix composites. Embodiments of the present invention pertain to metal matrix composites (e.g., composite wires) having a plurality of substantially continuous, longitudinally positioned fibers contained within a metal matrix. Metal matrix composites according to the present invention are formed into wires exhibiting desirable properties with respect to elastic modulus, density, coefficient of thermal expansion, electrical conductivity, and strength.

The present invention provides a metal matrix composite wire that includes at least one tow (typically a plurality of tows) comprising a plurality of substantially continuous, longitudinally positioned fibers in a metal matrix. The fibers are selected from the group of ceramic fibers, carbon fibers, and mixtures thereof. Significantly, the wire has certain roundness, roundness uniformity, and/or diameter uniformity characteristics over specified lengths.

One preferred embodiment of the present invention is a metal matrix composite wire comprising at least one tow (typically a plurality of tows) comprising a plurality of at least one of substantially continuous, longitudinally positioned ceramic or carbon fibers in a metal matrix, wherein the wire has a roundness value of at least 0.9, a roundness uniformity value of not greater than 2%, and a diameter uniformity value of not greater than 1% over a length of at least 100 meters (preferably, at least 200 meters, more preferably, at least 300 meters). Preferably, in increasing order of preference, the roundness value is at least 0.91, 0.92, 0.93, 0.94, or 0.95; the roundness uniformity value is not greater than 1.9%, 1.8%, 1.7%, 1.6%, or 1.5%, and the diameter uniformity value is not greater than 0.95%, 0.9%, 0.85%, 0.8%, 0.75%, 0.7%, 0.65%, 0.6%, 0.55%, or 0.5. Typically, the roundness value is preferably in the range from about 0.92 to about 0.95.

Another preferred embodiment of the present invention is a metal matrix composite wire comprising at least one tow (typically a plurality of tows) comprising a plurality of at least one of substantially continuous, longitudinally positioned ceramic or carbon fibers in a metal matrix, wherein the wire has a roundness value of at least 0.85, a roundness uniformity value of not greater than 1.5%, and a diameter uniformity value of not greater than 0.5% over a length of at least 100 meters (preferably, at least 200 meters, more preferably, at least 300 meters). Preferably, in increasing order of preference, the roundness value is at least 0.86, 0.87, 0.88, 0.89, 0.9, 0.91, 0.92, 0.93, 0.94, or 0.95; the roundness uniformity value is not greater than 1.4%, 1.3%, 1.2%, 1.1%, or 1%; and the diameter uniformity value is not greater than 0.85%, 0.8%, 0.75%, 0.7%, 0.65%, 0.6%, 0.55%, or 0.5%. Typically, the roundness value is preferably in the range from about 0.92 to about 0.95.

In another embodiment, there is provided a method of making the composite wires according to the present invention. This method includes providing a contained volume of molten metal matrix material; immersing at least one tow (typically a plurality of tows) comprising a plurality of substantially continuous fibers into the contained volume of melted matrix material, wherein the fibers are selected from the group of ceramic fibers, carbon fibers, and mixtures thereof; imparting ultrasonic energy to cause vibration of at least a portion of the contained volume of molten metal matrix material to permit at least a portion of the molten metal matrix material to infiltrate into the plurality of fibers such that an infiltrated plurality of fibers is provided; and withdrawing the infiltrated plurality of fibers from the contained volume of molten metal matrix material under conditions which permit the molten metal matrix material to solidify to provide metal matrix composite wire according to the present invention.

In yet another embodiment, there is provided a cable that includes at least one metal matrix composite wire according to the present invention. Advantages of embodiments of wires according to the present invention in cable constructions allow, for example, more uniform packing of wires in the inner layers of the cable, due to the shape and diameter uniformity of the wire. Such shape and diameter uniformity also tend to reduce cable defects such as gaps between wires, or pinched wires, for example in the outer wire layers.

Definitions

As used herein, the following terms are defined as:

"Substantially continuous fiber" means a fiber having a length that is relatively infinite when compared to the average fiber diameter. Typically, this means that the fiber has an aspect ratio (i.e., ratio of the length of the fiber to the average diameter of the fiber) of at least about $1\times10^5$, preferably, at least about $1\times10^6$, and more preferably, at least about $1\times10^7$. Typically, such fibers have a length on the order of at least about 50 meters, and may even have lengths on the order of kilometers or more.

"Longitudinally positioned" means that the fibers are oriented in the same direction as the length of the wire.

"Roundness value," which is a measure of how closely the wire cross-sectional shape approximates a circle, is defined by the mean of the measured single roundness values over a specified length, as described in the Examples, below.

"Roundness uniformity value," which is the coefficient of variation in the measured single roundness values over a specified length, is the ratio of the standard deviation of the measured single roundness values divided by the mean of the measured single roundness values, as described in the Examples, below.

"Diameter uniformity value," which is the coefficient of variation in the measured average diameters over a specified length, is defined by the ratio of the standard deviation of the measured average diameters divided by the mean of the measured average diameters, as described in the Examples, below.

DETAILED DESCRIPTION OF PREFERRED EMBODIMENTS

Figure 1:
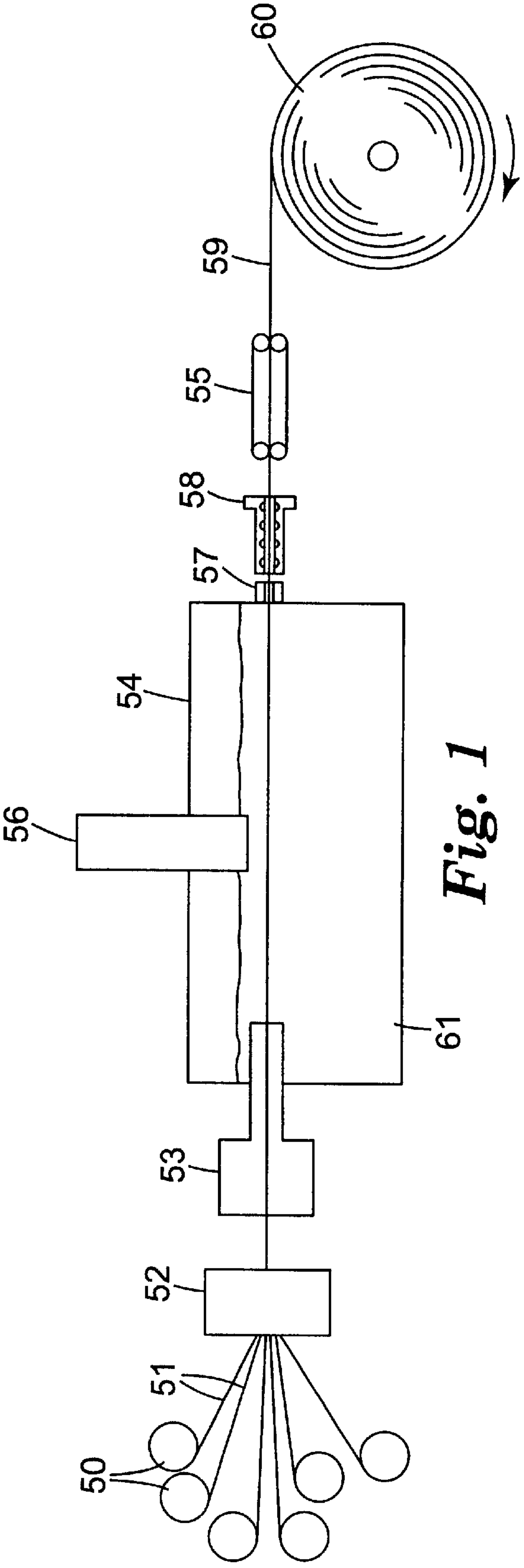
FIG. 1 is a schematic of the ultrasonic apparatus used to infiltrate fibers with molten metals.

The present invention provides wires and cables that include fiber reinforced metal matrix composites. A composite wire according to the present invention includes at least one tow comprising a plurality of substantially continuous, longitudinally positioned, reinforcing fibers such as ceramic (e.g., $Al_2O_3$-based) reinforcing fibers encapsulated within a matrix that includes one or more metals (e.g., highly pure elemental aluminum or alloys of pure aluminum with other elements, such as copper). Preferably, at least about 85% by number of the fibers are substantially continuous in a wire according to the present invention. At least one wire according to the present invention can be combined into a cable, preferably, an electric power transmission cable.

The substantially continuous reinforcing fibers preferably have an average diameter of at least about 5 micrometers. Typically, the diameter of the fibers is no greater than about 50 micrometers, more typically, no greater than about 25 micrometers.

Preferably, the fibers have a modulus of no greater than about 1000 GPa, and more preferably, no greater than about 420 GPa. Preferably, fibers have a modulus of greater than about 70 GPa.

Examples of substantially continuous fibers that may be useful for making metal matrix composite materials according to the present invention include ceramic fibers, such as metal oxide (e.g., alumina) fibers, silicon carbide fibers, and carbon fibers. Typically, the ceramic oxide fibers are crystalline ceramics and/or a mixture of crystalline ceramic and glass (i.e., a fiber may contain both crystalline ceramic and glass phases).

Preferably, the ceramic fibers have an average tensile strength of at least about 1.4 GPa, more preferably, at least about 1.7 GPa, even more preferably, at least about 2.1 GPa, and most preferably, at least about 2.8 GPa. Preferably, the carbon fibers have an average tensile strength of at least about 1.4 GPa, more preferably, at least about 2.1 GPa; even more preferably, at least about 3.5 GPa; and most preferably, at least about 5.5 GPa.

Tows are well known in the fiber art and refer to a plurality of (individual) fibers (typically at least 100 fibers, more typically at least 400 fibers) collected in a rope-like form. Tows preferably comprise at least 780 individual fibers per tow, and more preferably at least 2600 individual fibers per tow. Tows of ceramic fibers are available in a variety of lengths, including 300 meters and longer. The fibers may have a cross-sectional shape that is circular or elliptical.

Methods for making alumina fibers are known in the art and include the method disclosed in U.S. Pat. No. 4,954,462 (Wood et al.), the disclosure of which is incorporated herein by reference.

Preferably, the alumina fibers are polycrystalline alpha alumina-based fibers and comprise, on a theoretical oxide basis, greater than about 99 percent by weight $Al_2O_3$ and about 0.2–0.5 percent by weight $SiO_2$, based on the total weight of the alumina fibers. In another aspect, preferred polycrystalline, alpha alumina-based fibers comprise alpha alumina having an average grain size of less than 1 micrometer (more preferably, less than 0.5 micrometer). In another aspect, preferred polycrystalline, alpha alumina-based fibers have an average tensile strength of at least 1.6 GPa (preferably, at least 2.1 GPa, more preferably, at least 2.8 GPa). Preferred alpha alumina fibers are commercially available under the trade designation "NEXTEL 610" from the 3M Company of St. Paul, Minn.

Suitable aluminosilicate fibers are described in U.S. Pat. No. 4,047,965 (Karst et al.), the disclosure of which is incorporated herein by reference. Preferably, the aluminosilicate fibers comprise, on a theoretical oxide basis, in the range from about 67 to about 85 percent by weight $Al_2O_3$ and in the range from about 33 to about 15 percent by weight $SiO_2$, based on the total weight of the aluminosilicate fibers. Some preferred aluminosilicate fibers comprise, on a theoretical oxide basis, in the range from about 67 to about 77 percent by weight $Al_2O_3$ and in the range from about 33 to about 23 percent by weight $SiO_2$, based on the total weight of the aluminosilicate fibers. One preferred aluminosilicate fiber comprises, on a theoretical oxide basis, about 85 percent by weight $Al_2O_3$ and about 15 percent by weight $SiO_2$, based on the total weight of the aluminosilicate fibers. Another preferred aluminosilicate fiber comprises, on a theoretical oxide basis, about 73 percent by weight $Al_2O_3$ and about 27 percent by weight $SiO_2$, based on the total weight of the aluminosilicate fibers. Preferred aluminosilicate fibers are commercially available under the trade designations "NEXTEL 440" ceramic oxide fibers, "NEXTEL 550" ceramic oxide fibers, and "NEXTEL 720" ceramic oxide fibers from the 3M Company.

Suitable aluminoborosilicate fibers are described in U.S. Pat. No. 3,795,524 (Sowman), the disclosure of which is incorporated herein by reference. Preferably, the aluminoborosilicate fibers comprise, on a theoretical oxide basis: about 35 percent by weight to about 75 percent by weight (more preferably, about 55 percent by weight to about 75 percent by weight) $Al_2O_3$; greater than 0 percent by weight (more preferably, at least about 15 percent by weight) and less than about 50 percent by weight (more preferably, less than about 45 percent, and most preferably, less than about 44 percent) $SiO_2$; and greater than about 5 percent by weight (more preferably, less than about 25 percent by weight, even more preferably, about 1 percent by weight to about 5 percent by weight, and most preferably, about 10 percent by weight to about 20 percent by weight) $B_2O_3$, based on the total weight of the aluminoborosilicate fibers. Preferred aluminoborosilicate fibers are commercially available under the trade designation "NEXTEL 312" from the 3M Company.

Suitable silicon carbide fibers are commercially available, for example, from COI Ceramics of San Diego, Calif. under the trade designation "NICALON" in tows of 500 fibers, from Ube Industries of Japan, under the trade designation "TYRANNO", and from Dow Corning of Midland, Mich. under the trade designation "SYLRAMIC".

Suitable carbon fibers are commercially available, for example, from Amoco Chemicals of Alpharetta, Ga. under the trade designation "THORNEL CARBON" in tows of 2000, 4000, 5,000, and 12,000 fibers, Hexcel Corporation of Stamford, Conn., from Grafil, Inc. of Sacramento, Calif. (subsidiary of Mitsubishi Rayon Co.) under the trade designation "PYROFIL", Toray of Tokyo, Japan, under the trade designation "TORAYCA", Toho Rayon of Japan, Ltd. under the trade designation "BESFIGHT", Zoltek Corporation of St. Louis, Mo. under the trade designations "PANEX" and "PYRON", and Inco Special Products of Wyckoff, N.J. (nickel coated carbon fibers), under the trade designations "12K20" and "12K50".

Commercially available fibers typically include an organic sizing material added to the fiber during their manufacture to provide lubricity and to protect the fiber strands during handling. It is believed that the sizing tends to reduce the breakage of fibers, reduces static electricity, and reduces the amount of dust during, for example, conversion to a fabric. The sizing can be removed, for example, by dissolving or burning it away. Preferably, the sizing is removed before forming the metal matrix composite wire according to the present invention. In this way, before forming the aluminum matrix composite wire the ceramic oxide fibers are free of sizing thereon.

It is also within the scope of the present invention to have coatings on the fibers. Coatings may be used, for example, to enhance the wettability of the fibers, to reduce or prevent reaction between the fibers and molten metal matrix material. Such coatings and techniques for providing such coatings are known in the fiber and metal matrix composite art.

Wires according to the present invention preferably comprise at least 15 percent by volume (more preferably, in increasing preference, at least 20, 25, 30, 35, 40, or 50 percent by volume) of the fibers, based on the total volume of the fibers and matrix material. Typically, metal matrix composite wires according to the present invention comprise in the range from about 30 to about 70 (preferably, about 40 to about 60) percent by volume of the fibers, based on the total volume of the fibers and matrix material.

Preferred metal matrix composite wires made according to the present invention have a length, in order of preference, of at least about 100 meters, at least about 200 meters, at least about 300 meters, at least about 400 meters, at least about 500 meters, at least about 600 meters, at least about 700 meters, at least about 800 meters, and at least about 900 meters.

The average diameter of the wire of the present invention is preferably at least about 0.5 millimeter (mm), more preferably, at least about 1 mm, and more preferably at least about 1.5 mm.

The matrix material may be selected such that the matrix material does not significantly react chemically with the fiber material (i.e., is relatively chemically inert with respect to fiber material), for example, to eliminate the need to provide a protective coating on the fiber exterior. Preferred metal matrix materials include aluminum, zinc, tin, and alloys thereof (e.g., an alloy of aluminum and copper). More preferably, the matrix material includes aluminum and alloys thereof. For aluminum matrix materials, preferably, the matrix comprises at least 98 percent by weight aluminum, more preferably, at least 99 percent by weight aluminum, even more preferably, greater than 99.9 percent by weight aluminum, and most preferably, greater than 99.95 percent by weight aluminum. Preferred aluminum alloys of aluminum and copper comprise at least about 98 percent by weight Al and up to about 2 percent by weight Cu. Although higher purity metals tend to be preferred for making higher tensile strength wires, less pure forms of metals are also useful.

Suitable metals are commercially available. For example, aluminum is available under the trade designation "SUPER PURE ALUMINUM; 99.99% Al" from Alcoa of Pittsburgh, Pa. Aluminum alloys (e.g., Al-2% by weight Cu (0.03% by weight impurities) can be obtained from Belmont Metals, New York, N.Y. Zinc and tin are available, for example, from Metal Services, St. Paul, Minn. ("pure zinc"; 99.999% purity and "pure tin"; 99.95% purity). Examples of tin alloys include 92 wt. % Sn-8 wt. % Al (which can be made, for example, by adding the aluminum to a bath of molten tin at 550° C. and permitting the mixture to stand for 12 hours prior to use). Examples of tin alloys include 90.4 wt. % Zn-9.6 wt. % Al (which can be made, for example, by adding the aluminum to a bath of molten zinc at 550° C. and permitting the mixture to stand for 12 hours prior to use).

The particular fibers, matrix material, and process steps for making metal matrix composite wire accoriding to the present invention are selected toprovide metal matrix composite wire with the desired properties. For example, the fibers and metal matrix materials are selected to be sufficiently compatible with each other and the wire fabrication process in order to make a desired wire. Additional details regarding some preferred techniques for making aluminum and aluminum alloy matrix composites are disclosed, for example, in copending application having U.S. Ser. No. 08/492,960, now issued as U.S. Pat. No. 6,245,425, and PCT application having publication No. WO 97/00976, published May 21, 1996, the disclosures of which are incorporated herein by reference.

Continuous composite wire according to the present invention can be made, for example, by continuous metal matrix infiltration processes. A schematic of a preferred apparatus for wire according to the present invention is shown in FIG. 1. Tows of substantially continuous ceramic and/or carbon fibers 51 are supplied from supply spools 50, and are collimated into a circular bundle and heat-cleaned while passing through tube furnace 52. The fibers are then evacuated in vacuum chamber 53 before entering crucible 54 containing the melt of metallic matrix material 61 (also referred to herein as "molten metal"). The fibers are pulled from supply spools 50 by caterpuller 55. Ultrasonic probe 56 is positioned in the melt in the vicinity of the fiber to aid in infiltrating the melt into tows 51. The molten metal of the wire cools and solidifies after exiting crucible 54 through exit die 57, although some cooling may occur before it fully exits crucible 54. Cooling of wire 59 is enhanced by streams of gas or liquid 58. Wire 59 is collected onto spool 60.

Heat-cleaning the fiber aids in removing or reducing the amount of sizing, adsorbed water, and other fugitive or volatile materials that may be present on the surface of the fibers. Preferably, the fibers are heat-cleaned until the carbon content on the surface of the fiber is less than 22% area fraction. Typically, the temperature of the tube furnace is at least about 300° C., more typically, at least 1000° C. for at least several seconds at temperature, although the particular temperature(s) and time(s) will depend, for example, on the cleaning needs of the particular fiber being used.

Preferably, the fibers are evacuated before entering the melt, as it has been observed that the use of such evacuation tends to reduce or eliminate the formation of defects such as localized regions with dry fibers. Preferably, in increasing order of preference, the fibers are evacuated in a vacuum of not greater than 20 Torr, not greater than 10 Torr, not greater than 1 Torr, and not greater than 0.7 Torr.

An example of a suitable vacuum system is an entrance tube sized to match the diameter of the bundle of fiber. The entrance tube can be, for example, a stainless steel or alumina tube, and is typically at least 30 cm long. A suitable vacuum chamber typically has a diameter in the range from about 2 cm to about 20 cm, and a length in the range from about 5 cm to about 100 cm. The capacity of the vacuum pump is preferably at least 0.2–0.4 cubic meters/minute. The evacuated fibers are inserted into the melt through a tube on the vacuum system that penetrates the aluminum bath (i.e., the evacuated fibers are under vacuum when introduced into the melt), although the melt is typically at substantially atmospheric pressure. The inside diameter of the exit tube essentially matches the diameter of the fiber bundle. A portion of the exit tube is immersed in the molten aluminum. Preferably, about 0.5–5 cm of the tube is immersed in the molten metal. The tube is selected to be stable in the molten metal material. Examples of tubes which are typically suitable include silicon nitride and alumina tubes.

Infiltration of the molten metal into the fibers is typically enhanced by the use of ultrasonics. For example, a vibrating horn is positioned in the molten metal such that it is in close proximity to the fibers. Preferably, the fibers are within 2.5 mm of the horn tip, more preferably within 1.5 mm of the horn tip. The horn tip is preferably made of niobium, or alloys of niobium, such as 95 wt. % Nb-5 wt. % Mo and 91 wt. % Nb-9 wt. % Mo. For additional details regarding the use of ultrasonics for making metal matrix composites, see, for example, U.S. Pat. Nos. 4,649,060 (Ishikawa et al.), 4,779,563 (Ishikawa et al.), and 4,877,643 (Ishikawa et al.), application having U.S. Ser. No. 08/492,960, now issued as U.S. Pat. No. 6,245,425, and PCT application having publication No. WO 97/00976, published May 21, 1996, the disclosures of which are incorporated herein by reference.

The molten metal is preferably degassed (e.g., reducing the amount of gas (e.g., hydrogen) dissolved in the molten metal) during and/or prior to infiltration. Techniques for degassing molten metal are well known in the metal processing art. Degassing the melt tends to reduce gas porosity in the wire. For molten aluminum the hydrogen concentration of the melt is preferably, in order of preference, less than 0.2, 0.15, and 0.1 $cm^3$/100 grams of aluminum.

The exit die is configured to provide the desired wire diameter. Typically, it is desired to have a uniformly round wire along its length. The diameter of the exit die is usually slightly larger than the diameter of the wire. For example, the diameter of a silicon nitride exit die for an aluminum composite wire containing about 50 volume percent alumina fibers is about 3 percent smaller than the diameter of the wire. Preferably, the exit die is made of silicon nitride, although other materials may also be useful. Other materials that have been used as exit dies in the art include conventional alumina. It has been found by Applicants, however, that silicon nitride exit dies wear significantly less than conventional alumina dies, and hence are more useful in providing the desired diameter and shape of the wire, particularly over lengths of wire.

Typically, the wire is cooled after exiting the exit die by contacting the wire with a liquid (e.g., water) or gas (e.g., nitrogen, argon, or air). Such cooling aids in providing the desirable roundness and uniformity characteristics.

Preferably, the average diameter of wire according to the present invention is at least 1 mm, more preferably, at least 1.5 mm, 2 mm, 2.5 mm, 3 mm, or 3.5 mm.

Metal matrix composite wires according to the present invention can be used in a variety of applications. They are particularly useful in overhead electrical power transmission cables.

Although not wanting to be bound by theory, for traditional metallic wires, the control of diameter is important because the variation in the tensile strength of the wire is directly proportional to the variation in the cross-sectional area of the wire. Although not wanting to be bound by theory, in composites, however, the tensile strength of the composite wire is governed largely by the amount of fiber contained in the wire and not variation in cross sectional area.

A cable can be subjected to combined tensile and bending stresses which in turn cause an elongation (also referred to as strain) of the material (e.g., wires) making up the cable. It is understood by those skilled in the art that the total strain is the superposition of the component strains due to the various mechanical loads subjected to the material (e.g. tensile, torsion, and bending). While the tensile component of strain is uniform across the wire cross section, the bending component of strain is non-uniform across the wire cross section, with the maximum values occurring at the outer diameters of the cross section, and minimum value at the center axis of the wire. As a result, any variation in diameter of the wire can result in variation of the bending strain imparted on the wire. When the total strain imparted on the material exceeds a certain value, referred to as the "strain-to-failure", the material will rupture and fail. In metal matrix composite severe loading situations in which large tensile loads are combined with bending loads, the variation in diameter may cause premature failure of the wire within the cable at the location of maximum bending.

The diameter of the wire is also important for geometrical reasons. The availability of wires having a round cross-section is desirable in order to allow for improved packing within the cable. Further, variation in the diameter of individual wires can result in undesirable variation of the overall cable itself.

Cables according to the present invention may be homogeneous (i.e., including only one type of metal matrix composite wire) or nonhomogeneous (i.e., including a plurality of secondary wires, such as metal wires). As an example of a nonhomogeneous cable, the core can include a plurality of wires according to the present invention with a shell that includes a plurality of secondary wires (e.g., aluminum wires).

Cables according to the present invention can be stranded. A stranded cable typically includes a central wire and a first layer of wires helically stranded around the central wire. Cable stranding is a process in which individual strands of wire are combined in a helical arrangement to produce a finished cable (see, e.g., U.S. Pat. Nos. 5,171,942 (Powers) and 5,554,826 (Gentry), the disclosures of which are incorporated herein by reference). The resulting helically stranded wire rope provides far greater flexibility than would be available from a solid rod of equivalent cross sectional area. The helical arrangement is also beneficial because the stranded cable maintains its overall round cross-sectional shape when the cable is subject to bending in handling, installation and use. Helically wound cables may include as few as 7 individual strands to more common constructions containing 50 or more strands.

Figure 2:
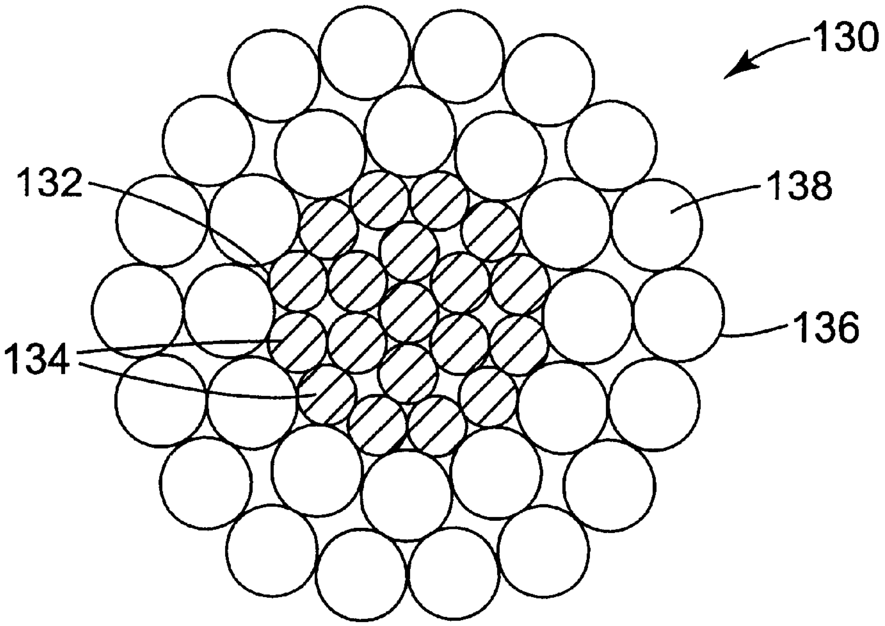
FIGS. 2 and 3 are schematic, cross-sections of two embodiments of overhead electrical power transmission cables having composite metal matrix cores.
Figure 3:
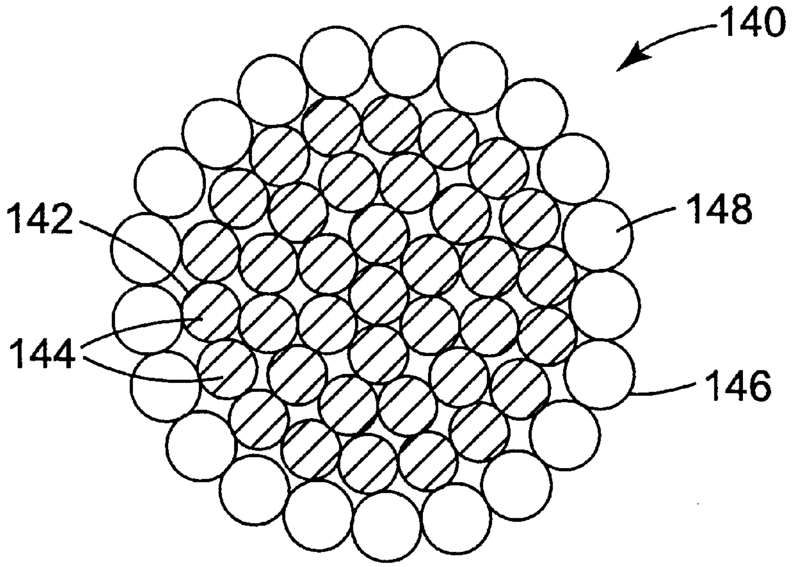

One exemplary electrical power transmission cable according to the present invention is shown in FIG. 2, where electrical power transmission cable according to the present invention 130 may be a core 132 of nineteen individual composite metal matrix wires 134 surrounded by a jacket 136 of thirty individual aluminum or aluminum alloy wires 138. Likewise, as shown in FIG. 3, as one of many alternatives, overhead electrical power transmission cable according to the present invention 140 may be a core 142 of thirty-seven individual composite metal matrix wires 144 surrounded by jacket 146 of twenty-one individual aluminum or aluminum alloy wires 148.

Figure 4:
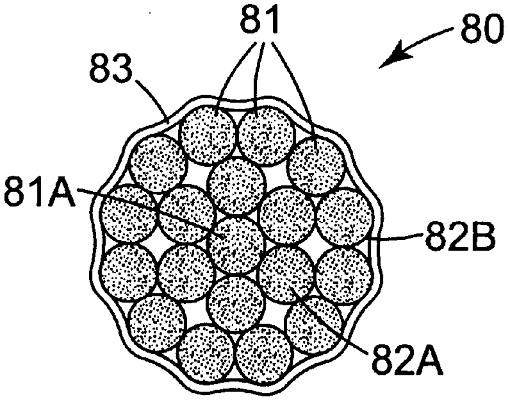
FIG. 4 is an end view of an embodiment of a stranded cable, prior to application of a maintaining means around the plurality of strands.

FIG. 4 illustrates yet another embodiment of the stranded cable 80. In this embodiment, the stranded cable includes a central metal matrix composite wire 81A and a first layer 82A of metal matrix composite wires that have been helically wound about the central metal matrix composite wire 81A. This embodiment further includes a second layer 82B of metal matrix composite wires 81 that have been helically stranded about the first layer 82A. Any suitable number of metal matrix composite wires 81 may be included in any layer. Furthermore, more than two layers may be included in the stranded cable 80 if desired.

Cables according to the present invention can be used as a bare cable or it can be used as the core of a larger diameter cable. Also, cables according to the present invention may be a stranded cable of a plurality of wires with a maintaining means around the plurality of wires. The maintaining means may be a tape overwrap, such as shown in FIG. 4 as 83, with or without adhesive, or a binder, for example.

Stranded cables according to the present invention are useful in numerous applications. Such stranded cables are believed to be particularly desirable for use in overhead electrical power transmission cables due to their combination of low weight, high strength, good electrical conductivity, low coefficient of thermal expansion, high use temperatures, and resistance to corrosion.

Figure 5:
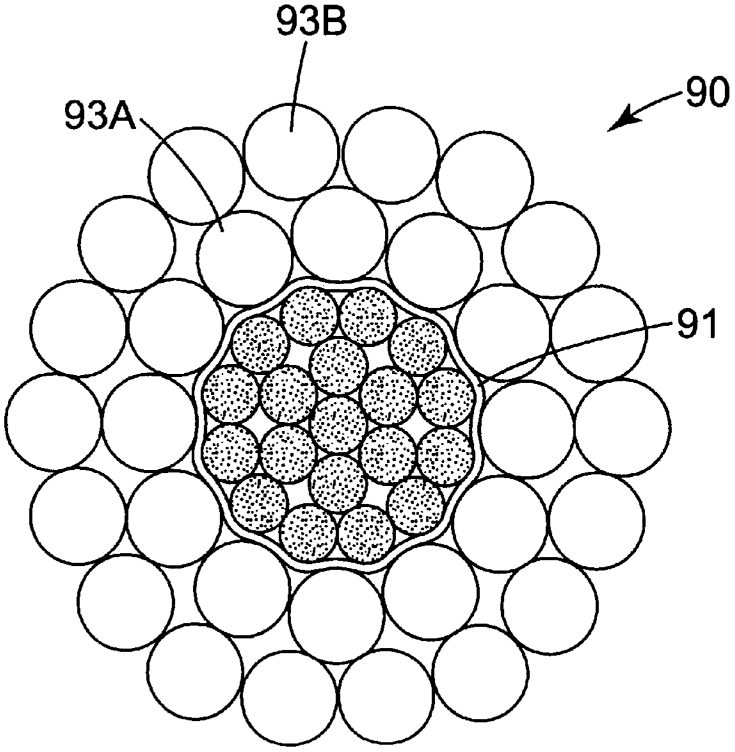
FIG. 5 is an end view of an embodiment of an electrical transmission cable.

An end view of one preferred embodiment of such a transmission cable 90 is illustrated in FIG. 5. Such a transmission cable includes a core 91 which can be any of the stranded cores described herein. The power transmission cable 90 also includes at least one conductor layer about the stranded core 91. As illustrated, the power transmission cable includes two conductor layers 93A and 93B. More conductor layers may be used as desired. Preferably, each conductor layer comprises a plurality of conductor wires as is known in the art. Suitable materials for the conductor wires includes aluminum and aluminum alloys. The conductor wires may be stranded about the stranded core 91 by suitable cable stranding equipment as is known in the art.

In other applications, in which the stranded cable is to be used as a final article itself, or in which it is to be used as an intermediary article or component in a different subsequent article, it is preferred that the stranded cable be free of electrical power conductor layers around the plurality of metal matrix composite wire 81.

Additional details regarding cables made from metal matrix composite wires are disclosed, for example, in application having U.S. Ser. No. 09/616,784, filed on the same date as the instant application, and application having U.S. Ser. No. 08/492,960, now issued as U.S. Pat. No. 6,245,425, and PCT application having publication No. WO 97/00976, published May 21, 1996, the disclosures of which are incorporated herein by reference. Additional details regarding making metal matrix composite materials and cables containing the same are disclosed, for example, in copending applications having U.S. Ser. Nos. 09/616,594, 09/616,589 and 09/616,741, all filed on the same date as the instant application, the disclosures of which are incorporated herein by reference.

EXAMPLES

This invention is further illustrated by the following examples, but the particular materials and amounts thereof recited in these examples, as well as other conditions and details, should not be construed to unduly limit this invention. Various modifications and alterations of the invention will become apparent to those skilled in the art. All parts and percentages are by weight unless otherwise indicated.

Test Procedures

Roundness Value

Roundness value, which is a measure of how closely the wire cross-sectional shape approximates a circle, is defined by the mean of the single roundness values over a specified length. Single roundness values for calculating the mean was determined as follows using a rotating laser micrometer (obtained from Zumbach Electronics Corp., Mount Kisco, N.Y. under the trade designation "ODAC 30J ROTATING LASER MICROMETER"; software: "USYS-100", version BARU13A3), set up such that the micrometer recorded the wire diameter every 100 msec during each rotation of 180 degrees. Each sweep of 180 degrees took 10 seconds to accomplish. The micrometer sent a report of the data from each 180 degree rotation to a process database. The report contained the minimum, maximum, and average of the 100 data points collected during the rotation cycle. The wire speed was 1.5 meters/minute (5 feet/minute). A single roundness value was the ratio of the minimum diameter to the maximum diameter, for the 100 data points collected during the rotation cycle. The roundness value was the mean of the measured single roundness values over a specified length. A single average roundness value was the average of the 100 data points.

Roundness Uniformity Value

Roundness uniformity value, which is the coefficient of variation in the measured single roundness values over a specified length, is the ratio of the standard deviation of the measured single roundness values divided by the mean of the measured single roundness values. The standard deviation was determined according to the equation:

$$\text{standard deviation} = \sqrt{\frac{n\sum_{i=1}^{n} x_i^2 - \left(\sum_{i=1}^{n} x_i\right)^2}{n(n-1)}} \qquad (1)$$

where n is the number of samples in the population (i.e., for calculating the standard deviation of the measured single roundness values for determining the diameter uniformity value n is the number of measured single roundness values over the specified length), and x is the measured value of the sample population (i.e., for calculating the standard deviation of the measured single roundness values for determining the diameter uniformity value x are the measured single roundness values over the specified length)

The measured single roundness values for determining the mean were obtained as described above for the roundness value.

Diameter Uniformity Value

Diameter uniformity value, which is the coefficient of variation in the measured single average diameter over a specified length, is defined by the ratio of the standard deviation of the measured single average diameters divided by the mean of the measured single average diameters. The measured single average diameter is the average of the 100 data points obtained as described above for roundness values. The standard deviation was calculated using Equation (1).

Example 1

Example 1 aluminum composite wire was prepared as follows. Referring to FIG. 1, thirty-two tows of 3000 denier alumina fibers (available from the 3M Company under the trade designation "NEXTEL 610"; Young's modulus reported in 1996 product brochure was 373 GPa) were collimated into a circular bundle. The circular bundle was heat cleaned by passing it, at a rate of 1.5 m/min., through a 1 meter tube furnace (obtained from ATS, Tulsa Okla.), in air, at 1000° C. The circular bundle was then evacuated at 1.0 Torr by passing the bundle through an alumina entrance tube (2.7 mm in diameter, 30 cm in length; matched in diameter to the diameter of the fiber bundle) into a vacuum chamber (6 cm in diameter; 20 cm in length). The vacuum chamber was equipped with a mechanical vacuum pump having a pumping capacity of 0.4 $m^3$/min. After exiting the vacuum chamber, the evacuated fibers entered a molten aluminum bath through an alumina tube (2.7 mm internal diameter and 25 cm in length) that was partially immersed (about 5 cm) in the molten aluminum bath. The molten aluminum bath was prepared by melting aluminum (99.94% pure Al; obtained from NSA ALUMINUM, HAWESVILLE, Ky.) at 726° C. The molten aluminum was maintained at about 726° C., and was continuously degassed by bubbling 800 $cm^3$/min. of argon gas through a silicon carbide porous tube (obtained from Stahl Specialty Co, Kingsville, Mo.) immersed in the aluminum bath. The hydrogen content of the molten aluminum was measured by quenching a sample of the molten aluminum in a copper crucible having a 0.64 cm×12.7 cm×7.6 cm cavity, and analyzing the resulting solidified aluminum ingot for its hydrogen content using a standardized mass spectrometer test analysis (obtained from LECO Corp., St. Joseph, Mich.).

Infiltration of the molten aluminum into the fiber bundle was facilitated through the use of ultrasonic infiltration. Ultrasonic vibration was provided by a wave-guide connected to an ultrasonic transducer (obtained from Sonics & Materials, Danbury Conn.). The wave guide consisted of a 91 wt % Nb-9 wt % Mo cylindrical rod, 25 mm in diameter by 90 mm in length attached with a central 10 mm screw, which was screwed to a 482 mm long, 25 mm in diameter titanium waveguide (90 wt. % Ti-6 wt. % Al-4 wt. % V). The Nb-9 wt % Mo rod was supplied by PMTI, Inc., Large, Pa. The niobium rod was positioned within 2.5 mm of the centerline of the fiber bundle. The wave-guide was operated at 20 kHz, with a 20 micrometer displacement at the tip. The fiber bundle was pulled through the molten aluminum bath by a caterpuller (obtained from Tulsa Power Products, Tulsa Okla.) operating at a speed of 1.5 meter/minute.

The aluminum infiltrated fiber bundle exited the crucible through a silicon nitride exit die (inside diameter 2.5 mm, outside diameter 19 mm and length 12.7 mm; obtained from Branson and Bratton Inc., Burr Ridge, Ill.). After exiting the molten aluminum bath, cooling of the wire was aided with the use of two streams of nitrogen gas. More specifically, two plugged tubes, having 4.8 mm inside diameters, were each perforated on the sides with five holes. The holes were 1.27 mm in diameter, and located 6 mm apart along a 30 mm length. Nitrogen gas flowed through the tubes at a flow rate of 100 liters per minutes, and exited through the small side holes. The first hole on each tube was positioned about 50 mm from the exit die, and about 6 mm away from the wire. The tubes were positioned, one on each side of the wire. The wire was then wound onto a spool. The composition of the Example 1 aluminum matrix, as determined by inductively coupled plasma analysis, was 0.03 wt. % Fe, 0.02 wt. % Nb, 0.03 wt. % Si, 0.01 wt. % Zn, 0.003 wt. % Cu, and the balance Al. While making the wire, the hydrogen content of the aluminum bath was about 0.07 $cm^3$/100 gm aluminum.

Fourteen separate runs of the aluminum composite wire were made. The diameter of the wires was 2.5 mm. At least 300 meters of wire were made for each run. The fiber volume fraction was measured by a standard metallographic technique. The wire cross-section was polished and the fiber volume fraction measured by using the density profiling functions with the aid of a computer program called NIH IMAGE (version 1.61), a public domain image-processing program developed by the Research Services Branch of the National Institutes of Health (obtained from website http// rsb.info.nih.gov/nih-image). This software measured the mean gray scale intensity of a representative area of the wire.

For each run, a piece of the wire was mounted in mounting resin (obtained under the trade designation "EPOXICURE" from Buehler Inc., Lake Bluff, Ill.). The mounted wire was polished using a conventional grinder/ polisher and conventional diamond slurries with the final polishing step using a 1 micrometer diamond slurry obtained under the trade designation "DIAMOND SPRAY" from Struers, West Lake, Ohio) to obtain a polished cross-section of the wire. A scanning electron microscope (SEM) photomicrograph was taken of the polished wire cross-section at 150×. When taking the SEM photomicrographs, the threshold level of the image was adjusted to have all fibers at zero intensity, to create a binary image. The SEM photomicrograph was analyzed with the NIH IMAGE software, and the fiber volume fraction obtained by dividing the mean intensity of the binary image by the maximum intensity. The accuracy of this method for determining the fiber volume fraction was believed to be +/−2%. The average fiber content of the wire was determined to be 54 volume percent.

The wire roundness, roundness uniformity value, and diameter uniformity value, were measured as described above, at intervals of 100 meters, 300 meters, and various other lengths. The results are reported in Tables 1, 2, and 3, below.

TABLE 1

| Run No. | Roundness value | Roundness uniformity value | Diameter uniformity value | Wire length, m |
|---|---|---|---|---|
| 1 | 0.9385 | 1.02% | 0.23% | 100 |
| 2 | 0.9408 | 1.16% | 0.22% | 100 |
| 3 | 0.9225 | 1.37% | 0.27% | 100 |
| 4 | 0.9441 | 1.14% | 0.22% | 100 |
| 5 | 0.9365 | 1.40% | 0.24% | 100 |

TABLE 1-continued

| Run No. | Roundness value | Roundness uniformity value | Diameter uniformity value | Wire length, m |
|---|---|---|---|---|
| 6 | 0.9472 | 1.02% | 0.21% | 100 |
| 7 | 0.9457 | 1.21% | 0.24% | 100 |
| 8 | 0.9419 | 1.12% | 0.27% | 100 |
| 9 | 0.9425 | 1.21% | 0.23% | 100 |
| 10 | 0.9493 | 1.28% | 0.29% | 100 |
| 11 | 0.9387 | 1.11% | 0.25% | 100 |
| 12 | 0.9478 | 0.94% | 0.26% | 100 |
| 13 | 0.9376 | 1.45% | 0.36% | 100 |
| 14 | 0.9421 | 1.35% | 0.44% | 100 |

TABLE 2

| Run No. | Roundness value | Roundness uniformity value | Diameter uniformity value | Wire length, m |
|---|---|---|---|---|
| 1 | 0.9416 | 1.01% | 0.29% | 300 |
| 2 | 0.9383 | 1.20% | 0.29% | 300 |
| 3 | 0.9220 | 1.55% | 0.28% | 300 |
| 4 | 0.9412 | 1.19% | 0.22% | 300 |
| 5 | 0.9354 | 1.25% | 0.25% | 300 |
| 6 | 0.9451 | 1.16% | 0.21% | 300 |
| 7 | 0.9443 | 1.18% | 0.25% | 300 |
| 8 | 0.9439 | 1.15% | 0.24% | 300 |
| 9 | 0.9420 | 1.21% | 0.23% | 300 |
| 10 | 0.9494 | 1.08% | 0.27% | 300 |
| 11 | 0.9355 | 1.03% | 0.25% | 300 |
| 12 | 0.9473 | 1.02% | 0.24% | 300 |
| 13 | 0.9373 | 1.38% | 0.34% | 300 |
| 14 | 0.9425 | 1.22% | 0.42% | 300 |

TABLE 3

| Run No. | Roundness value | Roundness uniformity value | Diameter uniformity value | Wire length, m |
|---|---|---|---|---|
| 1 | 0.9427 | 1.00% | 0.38% | 496 |
| 2 | 0.9344 | 1.69% | 0.43% | 914 |
| 3 | 0.9168 | 1.66% | 0.38% | 600 |
| 4 | 0.9378 | 1.88% | 1.53% | 834 |
| 5 | 0.9306 | 1.50% | 0.33% | 544 |
| 6 | 0.9432 | 1.20% | 0.34% | 466 |
| 7 | 0.9399 | 1.24% | 0.54% | 836 |
| 8 | 0.9407 | 2.03% | 0.82% | 916 |
| 9 | 0.9366 | 2.99% | 0.90% | 811 |
| 10 | 0.9517 | 0.96% | 0.26% | 826 |
| 11 | 0.9327 | 1.03% | 0.26% | 676 |
| 12 | 0.9475 | 1.01% | 0.23% | 374 |
| 13 | 0.9367 | 1.39% | 0.37% | 876 |
| 14 | 0.9364 | 1.36% | 1.15% | 909 |

Comparative Example A

Twelve separate runs of aluminum matrix composite wire, at least 300 meters in length, were prepared substantially as described in Example 2 of PCT/US96/07286, the disclosure of which is incorporated herein by reference, except thirty-six tows of 1500 denier fiber ("NEXTEL 610") were used, the diameter of the wire was 2.0 mm, and the fiber content of the wire 45 volume percent.

The wire roundness, roundness uniformity value and diameter uniformity value, were measured as described above, at intervals of 100 meters, 300 meters, and various other lengths. The results are reported in Tables 4, 5, and 6, below.

TABLE 4

| Run No. | Roundness value | Roundness uniformity value | Diameter uniformity value | Wire length, m |
|---|---|---|---|---|
| 1 | 0.8120 | 4.23% | 0.88% | 100 |
| 2 | 0.8470 | 2.83% | 0.58% | 100 |
| 3 | 0.8614 | 2.69% | 0.57% | 100 |
| 4 | 0.8589 | 3.95% | 1.11% | 100 |
| 5 | 0.8971 | 3.05% | 0.69% | 100 |
| 6 | 0.8841 | 2.43% | 0.68% | 100 |
| 7 | 0.8747 | 3.01% | 1.12% | 100 |
| 8 | 0.8465 | 2.43% | 0.61% | 100 |
| 9 | 0.8449 | 5.41% | 1.46% | 100 |
| 10 | 0.8501 | 3.01% | 0.67% | 100 |
| 11 | 0.8508 | 2.54% | 0.78% | 100 |
| 12 | 0.8576 | 5.66% | 1.42% | 100 |

TABLE 5

| Run No. | Roundness value | Roundness uniformity value | Diameter uniformity value | Wire length, m |
|---|---|---|---|---|
| 1 | 0.8365 | 3.86% | 0.68% | 300 |
| 2 | 0.8527 | 2.73% | 0.58% | 300 |
| 3 | 0.8637 | 2.89% | 0.72% | 300 |
| 4 | 0.8929 | 4.39% | 0.99% | 300 |
| 5 | — | — | — | <300 |
| 6 | 0.8974 | 2.43% | 0.69% | 300 |
| 7 | 0.8641 | 3.98% | 1.16% | 300 |
| 8 | 0.8460 | 2.38% | 0.65% | 300 |
| 9 | — | — | — | <300 |
| 10 | 0.8558 | 2.99% | 0.95% | 300 |
| 11 | 0.8540 | 3.61% | 1.16% | 300 |
| 12 | 0.8701 | 5.02% | 1.38% | 300 |

TABLE 6

| Run No. | Roundness value | Roundness uniformity value | Diameter uniformity value | Wire length, m |
|---|---|---|---|---|
| 1 | 0.8369 | 3.85% | 0.68% | 305 |
| 2 | 0.8532 | 2.68% | 0.61% | 341 |
| 3 | 0.8668 | 3.03% | 0.71% | 332 |
| 4 | 0.895 | 4.41% | 0.99% | 318 |
| 5 | 0.9008 | 2.83% | 0.77% | 283 |
| 6 | 0.8964 | 2.68% | 0.83% | 463 |
| 7 | 0.8644 | 4.28% | 1.25% | 436 |
| 8 | 0.8479 | 2.44% | 0.63% | 545 |
| 9 | 0.8571 | 4.81% | 2.42% | 255 |
| 10 | 0.8546 | 3.45% | 1.11% | 465 |
| 11 | 0.8556 | 3.18% | 1.19% | 466 |
| 12 | 0.8706 | 4.95% | 1.36% | 311 |

Comparative Example B

Comparative Example B was a 300 meter length of aluminum matrix composite wire obtained from Nippon Carbon Co. The wire was reported to have been made using SiC fibers (formerly available from Dow Coming (now available from COI Ceramics, San Diego, Calif.) under the trade designation "HI-NICALON"). The fiber content of the wire was determined, as described in Example 1, to be 52.5 volume percent. The diameter of the wire was 0.082 mm.

The wire roundness, roundness uniformity value and diameter uniformity value, were measured, as described above, over a 100 meter length to be 0.869, 2.45%, and 1.08%, respectively, over a 300 meter length to be 0.872, 2.56%, and 1.08%, respectively, and over a 474 meter length to be 0.877, 2.58%, and 1.03%, respectively.

Comparative Example C

Twenty separate runs of aluminum matrix composite wire, at least 300 meters in length, were prepared substantially as described in Example 2 of PCT/US96/07286, except fifty-four tows of 1500 denier fiber ("NEXTEL 610") were used, the diameter of the wire was 2.5 mm, and the fiber content of the wire 45 volume percent.

The wire roundness, roundness uniformity value and diameter uniformity value, were measured as described above, at intervals of 100 meters, 300 meters, and various other lengths. The results are reported in Tables 7, 8, and 9, below.

TABLE 7

| Run No. | Roundness value | Roundness uniformity value | Diameter uniformity value | Wire length, m |
|---|---|---|---|---|
| 1 | 0.8305 | 3.60% | 1.47% | 100 |
| 2 | 0.8772 | 2.63% | 0.59% | 100 |
| 3 | 0.8989 | 3.06% | 0.66% | 100 |
| 4 | 0.8772 | 3.04% | 0.86% | 100 |
| 5 | 0.8437 | 2.60% | 0.73% | 100 |
| 6 | 0.8936 | 2.69% | 0.37% | 100 |
| 7 | — | — | — | <100 |
| 8 | 0.9016 | 2.54% | 0.50% | 100 |
| 9 | 0.8565 | 3.36% | 0.59% | 100 |
| 10 | 0.8659 | 2.37% | 0.42% | 100 |
| 11 | 0.8578 | 2.09% | 1.02% | 100 |
| 12 | 0.8618 | 2.22% | 0.63% | 100 |
| 13 | 0.8987 | 2.08% | 0.76% | 100 |
| 14 | 0.8719 | 2.89% | 0.66% | 100 |
| 15 | 0.8891 | 3.74% | 1.12% | 100 |
| 16 | 0.8416 | 3.16% | 0.97% | 100 |
| 17 | 0.8416 | 2.24% | 0.48% | 100 |
| 18 | 0.8334 | 2.48% | 0.61% | 100 |
| 19 | 0.8845 | 4.28% | 0.88% | 100 |
| 20 | 0.8834 | 2.71% | 1.59% | 100 |

TABLE 8

| Run No. | Roundness value | Roundness uniformity value | Diameter uniformity value | Wire length, m |
|---|---|---|---|---|
| 1 | — | — | — | <300 |
| 2 | 0.8663 | 2.65% | 0.67% | 300 |
| 3 | 0.8676 | 3.67% | 0.64% | 300 |
| 4 | 0.8558 | 4.38% | 0.94% | 300 |
| 5 | 0.8512 | 3.54% | 0.99% | 300 |
| 6 | 0.8720 | 3.55% | 0.57% | 300 |
| 7 | — | — | — | <300 |
| 8 | 0.8684 | 4.62% | 0.84% | 300 |
| 9 | 0.8526 | 3.35% | 0.66% | 300 |
| 10 | — | — | — | <300 |
| 11 | 0.8906 | 3.73% | 1.45% | 300 |
| 12 | 0.8876 | 4.06% | 0.85% | 300 |
| 13 | 0.8910 | 2.06% | 0.83% | 300 |
| 14 | 0.8420 | 3.69% | 1.05% | 300 |
| 15 | 0.8942 | 2.90% | 0.82% | 300 |
| 16 | — | — | — | <300 |
| 17 | 0.8526 | 2.67% | 0.60% | 300 |
| 18 | 0.8566 | 4.00% | 0.69% | 300 |
| 19 | 0.8609 | 5.06% | 1.10% | 300 |
| 20 | 0.8712 | 3.91% | 1.20% | 300 |

TABLE 9

| Run No. | Roundness value | Roundness uniformity value | Diameter uniformity value | Wire length, m |
|---|---|---|---|---|
| 1 | 0.8606 | 4.42% | 1.11% | 299 |
| 2 | 0.8664 | 2.62% | 0.67% | 311 |
| 3 | 0.8615 | 4.38% | 0.69% | 334 |
| 4 | 0.8568 | 4.35% | 0.95% | 315 |
| 5 | 0.8525 | 3.55% | 0.98% | 311 |
| 6 | 0.8714 | 3.57% | 0.57% | 310 |
| 7 | 0.8789 | 2.00% | 0.39% | 32 |
| 8 | 0.8667 | 4.65% | 0.82% | 311 |
| 9 | 0.8531 | 3.35% | 0.68% | 347 |
| 10 | 0.8628 | 2.52% | 0.55% | 283 |
| 11 | 0.8913 | 3.68% | 1.46% | 314 |
| 12 | 0.8886 | 4.04% | 0.83% | 312 |
| 13 | 0.891 | 2.03% | 0.84% | 313 |
| 14 | 0.839 | 4.03% | 1.30% | 312 |
| 15 | 0.8949 | 2.88% | 0.81% | 311 |
| 16 | 0.8452 | 2.71% | 0.88% | 272 |
| 17 | 0.851 | 2.78% | 0.61% | 314 |
| 18 | 0.853 | 4.06% | 0.68% | 312 |
| 19 | 0.8587 | 5.26% | 1.13% | 317 |
| 20 | 0.8713 | 3.87% | 1.18% | 310 |

Comparative Example D

Ten separate runs of aluminum matrix composite wire, at least 300 meters in length, were prepared substantially as described in Example 2 of PCT/US96/07286, except eighty-six tows of 1500 denier fiber ("NEXTEL 610") were used, the diameter of the wire was 3.0 mm, and the fiber content of the wire 45 volume percent.

The wire roundness, roundness uniformity value and diameter uniformity value, were measured as described above, at intervals of 100 meters, 300 meters, and various other lengths. The results are reported in Tables 10, 11, and 12, below.

TABLE 10

| Run No. | Roundness value | Roundness uniformity value | Diameter uniformity value | Wire length, m |
|---|---|---|---|---|
| 1 | 0.8710 | 3.32% | 0.62% | 100 |
| 2 | 0.9176 | 2.03% | 0.59% | 100 |
| 3 | 0.9261 | 2.76% | 0.92% | 100 |
| 4 | 0.8885 | 1.97% | 0.66% | 100 |
| 5 | 0.8599 | 4.54% | 1.60% | 100 |
| 6 | 0.9617 | 2.85% | 0.78% | 100 |
| 7 | 0.8884 | 3.59% | 0.77% | 100 |
| 8 | 0.8772 | 2.24% | 0.62% | 100 |
| 9 | — | — | — | <100 |
| 10 | 0.8285 | 1.99% | 1.05% | 100 |

TABLE 11

| Run No. | Roundness value | Roundness uniformity value | Diameter uniformity value | Wire length, m |
|---|---|---|---|---|
| 1 | — | — | — | <300 |
| 2 | 0.9103 | 2.26% | 1.52% | 300 |
| 3 | 0.8954 | 3.30% | 1.39% | 300 |
| 4 | 0.886 | 2.05% | 0.60% | 300 |
| 5 | 0.8705 | 4.43% | 1.57% | 300 |
| 6 | 0.9028 | 2.67% | 1.05% | 300 |
| 7 | 0.8702 | 3.64% | 1.02% | 300 |
| 8 | 0.8925 | 2.29% | 0.59% | 300 |
| 9 | — | — | — | <300 |
| 10 | 0.8589 | 3.53% | 0.94% | 300 |

TABLE 12

| Run No. | Roundness value | Roundness uniformity value | Diameter uniformity value | Wire length, m |
|---|---|---|---|---|
| 1 | 0.8754 | 3.12% | 1.04% | 244 |
| 2 | 0.9102 | 2.23% | 1.59% | 309 |
| 3 | 0.8942 | 3.24% | 1.45% | 324 |
| 4 | 0.886 | 2.01% | 0.60% | 311 |
| 5 | 0.871 | 4.37% | 1.58% | 314 |
| 6 | 0.9025 | 2.64% | 1.05% | 311 |
| 7 | 0.8707 | 3.48% | 1.14% | 336 |
| 8 | 0.8931 | 2.27% | 0.59% | 312 |
| 9 | 0.8293 | 1.40% | 0.54% | 74 |
| 10 | 0.8597 | 3.52% | 0.94% | 314 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A metal matrix composite wire comprising at least one tow comprising a plurality of at least one of substantially continuous, longitudinally positioned ceramic or carbon fibers in a metal matrix, wherein the wire has a roundness value of at least 0.9, a roundness uniformity value of not greater than 2%, and a diameter uniformity value of not greater than 1% over a length of at least 100 meters.

2. The composite wire of claim 1 comprising a plurality of tows comprising the fibers.

3. The composite wire of claim 2 wherein the diameter uniformity value is not greater than 0.5% over a length of at least 100 meters.

4. The composite wire of claim 2 wherein the diameter uniformity value is not greater than 0.3% over a length of at least 100 meters.

5. The composite wire of claim 2 wherein the roundness uniformity value is not greater than 1.5% over a length of at least 100 meters.

6. The composite wire of claim 2 wherein the roundness uniformity value is not greater than 1.25% over a length of at least 100 meters.

7. The composite wire of claim 2 wherein the roundness value is at least 0.92 over a length of at least 100 meters.

8. The composite wire of claim 2 wherein the metal matrix comprises aluminum, zinc, tin, or alloys thereof.

9. The composite wire of claim 2 wherein the metal matrix comprises aluminum or alloys thereof.

10. The composite wire of claim 2 wherein at least about 85% by number of the fibers are substantially continuous.

11. The composite wire of claim 2 comprising at least about 15 volume percent of the fibers and no greater than about 70 volume percent fiber based on the total volume of the wire.

12. The composite wire of claim 2 wherein the fibers are ceramic fibers.

13. The composite wire of claim 2 wherein the fibers are ceramic oxide fibers.

14. The composite wire of claim 2 wherein the fibers are polycrystalline, alpha alumina-based fibers.

15. A metal matrix composite wire comprising at least one tow comprising a plurality of at least one of substantially continuous, longitudinally positioned ceramic or carbon fibers in a metal matrix, wherein the wire has a roundness value of at least 0.85, a roundness uniformity value of not greater than 1.5%, and a diameter uniformity value of not greater than 0.5% over a length of at least 100 meters.

16. The composite wire of claim 15 comprising a plurality of tows comprising the fibers.

17. The composite wire of claim 16 wherein the roundness value is at least 0.9 over a length of at least 100 meters.

18. The composite wire of claim 16 wherein the metal matrix comprises aluminum, zinc, tin, or alloys thereof.

19. The composite wire of claim 16 wherein the metal matrix comprises aluminum or alloys thereof.

20. The composite wire of claim 16 wherein at least about 85% by number of the fibers are substantially continuous.

21. The composite wire of claim 16 comprising at least about 15 volume percent of the fibers and no greater than about 70 volume percent fiber based on the total volume of the wire.

22. The composite wire of claim 16 wherein the fibers are ceramic fibers.

23. The composite wire of claim 16 wherein the fibers are ceramic oxide fibers.

24. The composite wire of claim 16 wherein the fibers are polycrystalline, alpha alumina-based fibers.

25. A cable comprising at least one metal matrix composite wire comprising at least one tow comprising a plurality of at least one of substantially continuous, longitudinally positioned ceramic or carbon fibers in a metal matrix, wherein the wire has a roundness value of at least 0.9, a roundness uniformity value of not greater than 2%, and a diameter uniformity value of not greater than 1% over a length of at least 100 meters.

26. The cable of claim 25 comprising a plurality of tows comprising the fibers.

27. The cable of claim 26 wherein the metal matrix comprises aluminum, zinc, tin, or alloys thereof.

28. The cable of claim 26 wherein the fibers are ceramic fibers.

29. The cable of claim 26 wherein the fibers are ceramic oxide fibers.

30. The cable of claim 26 wherein the metal matrix comprises aluminum or alloys thereof.

31. The cable of claim 26 comprising a core and a shell wherein the core comprises the composite wires and the shell comprises the secondary wires.

32. A cable comprising at least one metal matrix composite wire comprising at least one tow comprising a plurality of at least one of substantially continuous, longitudinally positioned ceramic or carbon fibers in a metal matrix, wherein the wire has a roundness value of at least 0.85, a roundness uniformity value of not greater than 1.5%, and a diameter uniformity value of not greater than 0.5% over a length of at least 100 meters.

33. The cable of claim 32 comprising a plurality of tows comprising the fibers.

34. The cable of claim 33 wherein the metal matrix comprises aluminum, zinc, tin, or alloys thereof.

35. The cable of claim 33 wherein the fibers are ceramic fibers.

36. The cable of claim 33 wherein the fibers are ceramic oxide fibers.

37. The cable of claim 33 wherein the metal matrix comprises aluminum or alloys thereof.

38. The cable of claim 33 comprising a core and a shell wherein the core comprises the composite wires and the shell comprises the secondary wires.

39. A method for making a metal matrix composite wire comprising a plurality of substantially continuous, longitudinally positioned fibers in a metal matrix, the method comprising:

providing a contained volume of molten metal matrix material;

immersing at least one tow comprising a plurality of substantially continuous fibers into the contained volume of melted matrix material, wherein the fibers are selected from the group of ceramic fibers, carbon fibers, and mixtures thereof;

imparting ultrasonic energy to cause vibration of at least a portion of the contained volume of molten metal matrix material to permit at least a portion of the molten metal matrix material to infiltrate into the plurality of fibers such that an infiltrated plurality of fibers is provided; and withdrawing the infiltrated plurality of fibers from the contained volume of molten metal matrix material under conditions which permit the molten metal matrix material to solidify to provide a metal matrix composite wire comprising at least one tow comprising a plurality of at least one of substantially continuous, longitudinally positioned ceramic or carbon fibers in a metal matrix, wherein the wire has a roundness value of at least 0.9, a roundness uniformity value of not greater than 2%, and a diameter uniformity value of not greater than 1% over a length of at least 100 meters.

40. A method for making a metal matrix composite wire comprising a plurality of substantially continuous, longitudinally positioned fibers in a metal matrix, the method comprising:

providing a contained volume of molten metal matrix material;

immersing at least one tow comprising a plurality of substantially continuous fibers into the contained volume of melted matrix material, wherein the fibers are selected from the group of ceramic fibers, carbon fibers, and mixtures thereof;

imparting ultrasonic energy to cause vibration of at least a portion of the contained volume of molten metal matrix material to permit at least a portion of the molten metal matrix material to infiltrate into the plurality of fibers such that an infiltrated plurality of fibers is provided; and withdrawing the infiltrated plurality of fibers from the contained volume of molten metal matrix material under conditions which permit the molten metal matrix material to solidify to provide a metal matrix composite wire comprising at least one tow comprising a plurality of at least one of substantially continuous, longitudinally positioned ceramic or carbon fibers in a metal matrix, wherein the wire has a roundness value of at least 0.85, a roundness uniformity value of not greater than 1.5%, and a diameter uniformity value of not greater than 0.5% over a length of at least 100 meters.

* * * * *

UNITED STATES PATENT AND TRADEMARK OFFICE
CERTIFICATE OF CORRECTION

PATENT NO. : 6,344,270 B1 Page 1 of 1
DATED : February 5, 2002
INVENTOR(S) : Colin McCullough It is certified that error appears in the above-identified patent and that said Letters Patent is hereby corrected as shown below:

Title page,
Item [56], FOREIGN PATENT DOCUMENT, delete "54-89907" and insert in place thereof -- S 54-89907 --.
OTHER PUBLICATIONS,
Delete, "VIbration" and insert in place thereof -- Vibration --.
Delete, "B.c." and insert in place thereof -- B.C. --.
Delete, "(?)" and insert in place thereof -- 43 --.

Column 6,
Line 34, delete "toprovide" and insert in place thereof -- to provide --.

Signed and Sealed this

Twenty-fifth Day of February, 2003

JAMES E. ROGAN
*Director of the United States Patent and Trademark Office*